United States Patent

Andrews et al.

[11] 4,015,138
[45] Mar. 29, 1977

[54] SEQUENCE CONTROL CIRCUIT

[75] Inventors: John Frederick Collett Andrews, Lingfield; Edward Stanislaw Budzinski, Ickenham; David Henry Pearson, Harrow, all of England

[73] Assignee: Coal Industry (Patents) Limited, London, England

[22] Filed: Oct. 18, 1974

[21] Appl. No.: 516,076

[30] Foreign Application Priority Data

Nov. 2, 1973 United Kingdom ............ 50987/73

[52] U.S. Cl. .................................................. 307/41
[51] Int. Cl.[2] ...................... H02J 1/00; H02J 3/00
[58] Field of Search ............ 200/175, 178, 179; 307/112, 115, 139, 142, 141, 41, ; 317/123, 137, 139, 157; 335/113, 114, 116, 117, 123, 138–140

[56] References Cited
UNITED STATES PATENTS

| | | | |
|---|---|---|---|
| 1,767,862 | 6/1930 | Stehlik | 200/179 |
| 2,137,507 | 11/1938 | Ostline | 200/175 |
| 2,802,153 | 8/1957 | Bonn | 317/157 X |
| 2,963,628 | 12/1960 | Ostland | 317/157 |
| 2,968,746 | 1/1961 | Flan et al. | 317/157 X |
| 3,110,776 | 11/1963 | Hogan et al. | 335/123 X |
| 3,371,198 | 2/1968 | Greening | 335/138 X |
| 3,747,620 | 7/1973 | Kah, Jr. | 307/41 X |
| 3,863,079 | 1/1975 | Calabrese et al. | 307/141 X |

Primary Examiner—James B. Scott
Attorney, Agent, or Firm—James C. Wray

[57] ABSTRACT

A sequence control circuit makes use of a stepping switch to progress the steps of an automatically controlled apparatus. The switch steps as limit switches operate to conclude each stage of the sequence and proving switches, in series with the limit switches, operate to complete sub-circuits and prove the state of the circuit as satisfactory.

14 Claims, 2 Drawing Figures

LIMIT SWITCH POSITIONS

IN STROKE
LS1 • ————▶ • LS2

DOWN STROKE
• LS3
↓
▼ LS4

TWIST
LS6 •͜• LS5

LS6 •͜• LS5
UNTWIST

UP STROKE
▲ LS3
↑
• LS4

LS1 •◀———— • LS2
OUT STROKE

LS7 TELESCOPE RAISED

LS8 TELESCOPE LOWERED

LS9 CLOSED WHEN GATE IS CLOSED

FIG. 2.

SEQUENCE CONTROL CIRCUIT

BACKGROUND OF THE INVENTION

This invention relates to a sequence control circuit for automatically controlling the sequence of events in an industrial process or system.

The invention has particular application to the control of the charging of coke ovens with coal where the lid has to be raised before the oven is charged and then replaced as quickly as possible after the charge is made.

In our co-pending U.S. Pat. application Ser. No. 394,528 filed Sept. 5, 1975 now U.S. Pat. No. 3,966,060 we describe and claim a lifting apparatus for removing and replacing an object in a fixed location in which the lifting apparatus includes an arm carrying at one end engaging means for the object to be lifted, first rotating means for the arm, lifting and lowering means for the arm and second rotating means adapted to cause at least partial rotation of the engaging means. This apparatus is therein specifically embodied in an arm which swivels over a coke oven, engages a lid of the oven, twists it, lifts it and swings it out of the way of a charging hopper which fills it and then, after filing, swings the lid back and lowers it in position before oscillating it to settle it in and then finally disengaging the arm, raising it and swinging it back to its original position.

The movements are affected by pneumatically operated valves and it is essential that the sequence of the valve operations is correct. The present invention is devised to provide a correct and automatic means of providing this sequence. While designed for the particular application of the lifting apparatus referred to above, the invention is not limited to this application and can have many other applications where similar problems are encountered.

The problems to be overcome are those where only a small current is required to operate control members without the use of pilot relays or pilot solenoids and where a reliable resettable stepping sequence operating on a fail safe basis is essential.

SUMMARY OF THE INVENTION

According to the present invention a sequence control circuit for an automatic sequence control system comprises a plurality of limit switches each arranged to indicate when a particular state in the sequence has been reached, stepping switch means for stepping the circuit through the stages of the sequence and position proving relays associated with respective limit switches to complete a circuit to the stepping switch and initiate the next stage of the sequence.

The stepping switch means may be connected to control directly solenoid valves operating parts of the apparatus to be controlled. The circuit may include partial manual operation and all or some of the stages may be able to be overridden manually.

A start up alarm arrangement may be included in the circuit and means, such as load cells, may be used to prevent the circuit operating until a previous sequence is complete.

A latching relay may be employed to prevent continued cycling of the circuit and reset means may be provided arranged to operate to reset the stepping switch means at the end of a sequence or if the sequence is interrupted and restarted.

In order that the invention may be readily understood a control system for a lid lifting equipment substantially as described in our application No. U.S. Pat. No. 3,966,060 will now be described, by way of example only, with reference to the accompanying drawings.

BRIEF DESCRIPTION OF THE DRAWINGS

In the drawings, FIG. 1 shows a circuit diagram of a control circuit and FIG. 2 shows the positions of limit switches associated with the limit.

DETAILED DESCRIPTION

Figure 1:
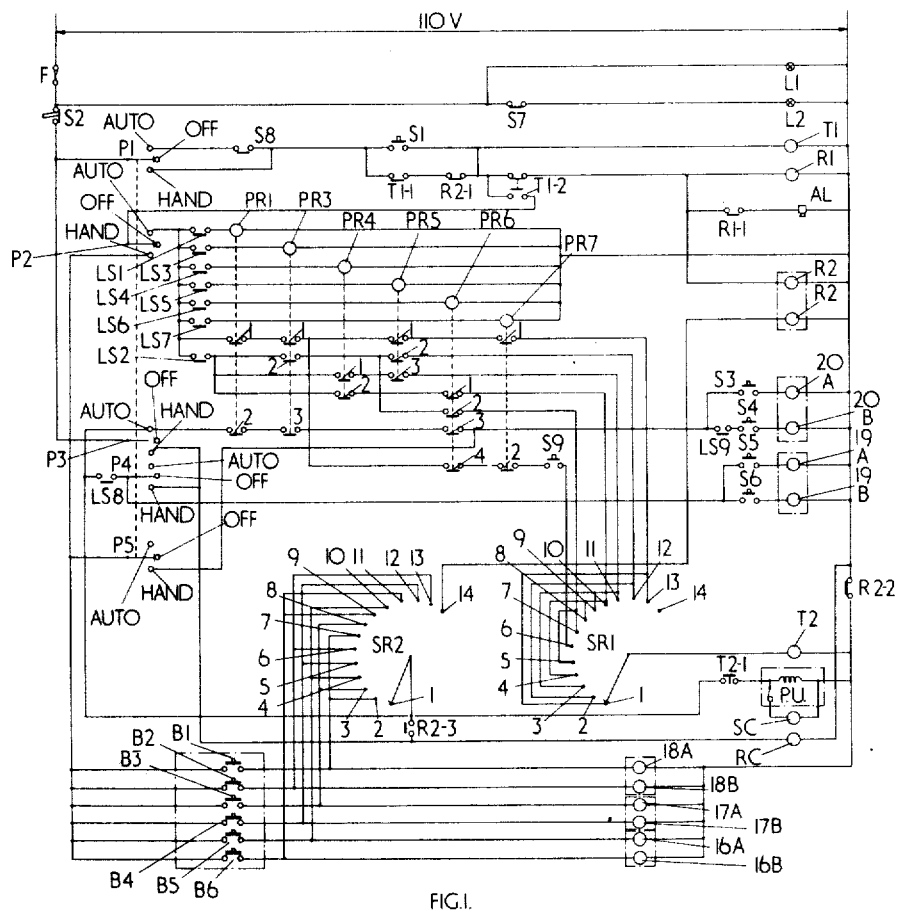

Referring now to the drawings, it is assumed that the lid is in position on a coke oven and the lifting equipment is in its rest position with the lifting arm swung away from the lid and in a raised position. Limit switches (LS) are positioned at the extremes of movement of the arm and when the arm is in one of its extreme positions a limit switch is closed. There are eight limit switches in all; as shown in FIGS. 1 and 2 the first two, L.S.1 and L.S.2, define respectively the outboard and inboard limits of the lid lifting arm; L.S.3 and L.S.4 define respectively the raised and lower positions of the arm, L.S.5 denotes the untwisted position of a lid carried by the arm and L.S.6 the fully twisted position; and L.S.7 and L.S.8 denote respectively the raised and lowered limits of a telescopic member which extends from a hopper into a coke oven during charging.

The circuit is capable of being controlled either manually or automatically by operating a ganged three position five pole switch P to Auto, Off or Hand positions. The five poles are shown with P1, P2, P3, P4 and P5 in FIG. 1 in the Off position. Two mechanically coupled stepping relay (SR) banks SR1, SR2 comprise a stepping relay and are incorporated to control the sequence when on automatic control. The stepping relay is controlled by a sequence delay timer T2 and associated contacts, a pulse unit PU and stepping coil SC and a reset coil RC. The stepping relay has two functions, that of bank SR1 is to receive signals from the switch combinations (to be described) and that of bank SR2 to control pneumatically operated solenoid valves which effect the movement required. These valves are shown in pairs as 16A, 16B; 17A, 17B; 18A, 18B. The A valve controls movement in one direction and the B valve movement in the opposite direction.

Stepping relay bank SR1 is associated with switch combinations which are set up when various ones of position proving relays PR associated with respective time switches are energized. The relays are in seven parallel circuits with their contacts in associated circuits connected to the various contacts of SR1.

The circuit includes a starting switch S1 which is normally open, a pre-start warning timer T1 and a relay R1 which energize a siren AL when the sequence is starting up. A stop button S2 in series with a fuse F in a main supply line is provided for emergency use. A relay R2 is incorporated to enable the system to reset to start conditions at the beginning of each cycle and to latch the system out at the end of a cycle so that it does not reset automatically if not switched off.

Switches S3, S4 are manually operated push button switches to control respectively the lowering and raising of the telescopic arm through solenoids 20A, 20B. Similar switches S5, S6 control respectively solenoids 19A, 19B to open and close the hopper gates for feeding coal to the coke oven.

Indicating light L1 shows when the supply is on to the circuit and light L2, which is in series with a switch S7 in one of the hoppers, indicates that that hopper is empty. A further switch S8 closes when a different hopper is empty.

A series of switches B are used only when the system is on manual control and gives direct control of the solenoids 17, 18, 19. The actual initiation of the lid replacement is controlled manually even in automatic operation through operation of a push button switch S9.

The operation of a typical sequence will now be described. It is assumed that the coke ovens are being charged from four hoppers and tha the requirement for charging is the same for each oven, i.e., the arm is to be swung in, engaged with the lid by lowering and twisting, lifting the lid, swinging the arm and lid away, lowering the telescope, discharging from the hopper, raising the telescope, swinging back the arm and lid, lowering the lid, discharging the arm, lifting the arm and returning it to its rest position. The circuit is supplied from a 110 volt a.c. supply source and will operate on automatic. The notation used for contacts is that of X-1 where X is the appropriate relay, etc., and the number is the identity of the contact referred to.

The switch P is first set to the auto position so that P1, P2 and P3 are connected to lines and P4 and P5 are isolated. With switch S8 closed (showing the previous hopper was fully emptied) switch S1 is closed to start the sequence by energizing T1 and R1. As T1 is energized contact T1-1 closes to hold the circuit energized once S1 is released via R2-1 (normally closed) and T1-2. Relay R1 causes contacts R1-1 in the alarm circuit to close so that the alarm AL emits an audible signal indicating the charging operation is about to start. After a time delay determined by timer T1 contacts T1-2 change over de-energizing relay R1 opening contacts R1-1 and disconnecting the alarm AL. As T1-2 closes it connects the supply to P2. In the rest position limit switches L.S.1, L.S.3, L.S.5 and L.S.7 are closed. Since limit switch L.S.1 is closed relay PR1 is immediately energized closing contacts PR1-1, PR1-2; similarly relays PR3, PR5 and PR7 close their contacts. A circuit is thus completed from P2 through contacts PR1-1, PR3-1, PR5-1 and PR7-1 to contacts SR1-1 and SR1-13 of stepping relay SR1. At the commencement of the sequence the rising arms of both stepping relays are in contact with their first contacts SR1-1 and SR2-1 so that a connection is made via SR1-1 to sequence delay time T2. After a short period timer T2 causes contacts T2-1 to close energizing pulse unit PU which gives an output to stepping coil (SC) which in turn causes the moving arms of stepping relays SR1, SR2 to step on to their second contacts.

As SR1 moves to SR1-2 the timer T2 is deenergized and T2-1 opens. As soon as SR2-2 is made solenoid 18A is energized and operates to swing the arm in. As the arm reaches the end of its inward stroke limit switch L.S.1 opens so that PR1 is no longer energized and its contacts open. L.S.2 now closes and, since PR3-2 and PR5-2 are still closed, current is supplied to contact SR1-2. Timer T2 again operates as before to step on the relays SR1, SR2 and supply current is then fed via SR2-3 to solenoid valve 17A to cause the arm to lower.

As the arm lowers, L.S.3 opens, deenergizing PR3 and opening its associated contacts. In the fully lowered position limit switch L.S.4 is closed, causing PR4 to be energized and its contacts to close. Since L.S.2 is still closed current is fed to SR1-3 through L.S.2, PR4-1 and PR5-3. Stepping relays SR move on so that valve 16A is now energized via SR2-4 to cause the arm to twist and engage the lid. The twisting action opens L.S.5 deenergizing PR5 and closes L.S.6 energizing PR6.

As PR6 is energized contact PR6-1 closes completing a circuit through L.S.2 and PR4-2 to SR1-4. The stepping switches now move on and current through SR2-5 is fed to valve 17B to cause it to reverse and raise the arm. L.S.4 now opens and L.S.3 recloses to re-energize PR3. As contact PR3-2 closes, it completes a circuit via L.S.2 and PR6-2 to SR1-5. The stepping relays move on one step and SR2-6 is energized to operate valve 18B and cause the arm to swing out to its original position where L.S.1 closes and L.S.2 opens.

The lid is now removed and the oven can be charged. The charging is controlled manually. First the telescope must be lowered into the lid aperture by the operator closing switch S3. This completes a circuit from the supply via switch P3 and contacts PR1-2, PR3-3 and PR6-3 to solenoid valve 20A. It should be noted that the telescope cannot be lowered until the arm is fully swung away to the position where it closes L.S.1. When the telescope is fully lowered L.S.8 is closed and L.S.7 is opened. The hopper gate can now be opened by closing switch S5 to energize solenoid 19A from P3 through L.S.8. When the hopper is empty switch S7 is closed illuminating light L2. The operator now closes switch S6 which energizes solenoid valve 19B to close the gates. When the gates are closed limit switch L.S.9 is closed to enable the operator to close S4 to energize valve 20B and cause the telescope to rise.

With the telescope fully raised and limit switch L.S.7 reclosed and L.S.8 open the automatic sequence can be restarted to replace the lid by the operator closing switch S9. This action connects current from P2 to SR1-6 through contacts PR1-1, PR3-1, PR6-4 and PR7-2. SR1 and SR2 step on once more and current through SR2-7 to valve 18A causes the arm to swing in again opening L.S.1 and closing L.S.2. Current is thus now fed via L.S.2, PR3-2 and PR6-2 to SR1-7. Stepping on occurs and current via SR2-8 is now fed to valve 17A to lower the arm and reposition the lid. With the lid in position L.S.3 is opened and L.S.4 is closed.

The closing of L.S.4 re-energizes PR4 closing PR4-2 in the circuit L.S.2 and PR6-1 to SR1-8. Stepping on again takes place and solenoid valve 16B is energized via SR2-9 to untwist the arm. L.S.6 opens and L.S.5 closes to energize PR5 and close PR5-3. This completes the circuit through L.S.2 and PR4-1 to SR1-9 which steps on to energize valve 16A via SR2-10. The lid twists again and L.S.5 opens and L.S.6 closes. The purpose of the twisting of the lid and untwisting it is to ensure that it is properly bedded down in its seating.

The closing of L.S.6 energizes PR6 and closes PR6-1 to connect P3 to SR1-10 via L.S.2 and PR4-2. This causes the SRs to step and SR2-11 to energize 16B to cause the arm to untwist. The lid is now disengaged from the arm and the arm must be raised and returned to its original position.

When the untwisting is fully completed L.S.5 is closed and L.S.6 open. PR5 is thus energized to close PR5-3 and to connect P3 to SR1-11 via L.S.2 and PR4-1. SR1 and SR2 step on and current passes via SR2-12 to valve 17B to cause the arm to rise with the consequential opening of L.S.4 and closing of L.S.3 to energize PR3. PR3-2 is now closed and connects P3 to SR1-12 via L.S.2 and P5-2. SR1 steps on to contact SR1-13 and SR2 on to contact SR2-13 whereby current is fed to valve 18B to cause the arm to swing out and return to its original position. In this position L.S.1 is closed and L.S.2 is opened. The circuit to SR1 is now through contacts PR1-1, PR3-1 and PR7-1. SR1 steps on to contact dead contact SR1-14 and SR2 steps to contact SR2-14 to connect current to R2. This operates to latch out the system by opening R2-1 and R2-2 and prevent it automatically recycling. When the next cycle is to be initiated the operation of S1 energizes R2 to reset SR1 and SR2 to their starting positions by closing R2-3 to energize the reset coil RC.

If the sequence is to be operated manually the switch P is moved to the hand position so that substantailly all the circuitry associated with P2 is taken out of service. The action operates the reset coil RC and automatically resets the stepping switches SR1 and SR2 to start ready for the next auto cycle.

On manual operation the start sequence with the alarm is as before although once the warning from AL has ceased all operations are controlled by switches B or S3, S4, S5 and S6.

The electrical circuit described is able to ensure that the lid lifting, charging and lid replacing operation takes place as quickly as possible without any risk of a wrong operation taking place. By allowing the operator some control, it ensures that the system is sufficiently flexible to deal with minor crises which may arise without disturbing the whole charging operation.

We claim:

1. A sequence control circuit for an automatic sequence control system comprising a power supply, a plurality of limit switches separately connected to the power supply and each arranged to be associated with a separate movement of an operation of apparatus to be controlled, position proving switches having power-driven operators connected respectively with each limit switch, the position proving switches being arranged to be operated when a limit switch has reached an extreme position, a plurality of contacts connected to operators of the proving switches, and a multiple contact stepping switch adapted to initiate each next stage in the sequence, the contacts of the stepping switch being connected with selected contacts of the said proving switches and selected limit switches to enable sequential circuits to be completed and supply power to stepping means connected to the stepping switch to step the stepping switch through its sequence.

2. A circuit according to claim 1 and including a second multiple contact stepping switch and means connected to the second switch and to the stepping means for stepping the second switch in concert with the said stepping switch.

3. A circuit according to claim 2 and including valve operators connected selectively to contacts of the said second stepping switch.

4. A circuit according to claim 3 and including manual override switches connected to the valve operators.

5. A circuit according to claim 2 and including resetting means connected to the second stepping switch for resetting the stepping switches to their original condition.

6. A circuit according to claim 1 and including starting means connected to the power supply for starting the system and alarm means connected to the starting means to operate at the start of the sequence.

7. A circuit according to claim 2 and including latching relay means having an operator connected to a last contact of the second stepping switch and having a relay contact connected to a movable contact of the second stepping switch for locking out said switch at the end of a cycle of operations.

8. A sequence control circuit for an automatic sequence control system comprising a power supply plurality of first switches connected to the power supply, and each arranged to be separately operated, a plurality of proving switches having operators and contacts, the operators of the proving switches being connected respectively with each first switch to receive power therethrough, the proving switches being arranged to receive power and to be operated when a first switch has reached an extreme position, a plurality of contacts on each proving switch, and a first stepping switch having multiple contacts for initiating each next stage in the sequence, the contacts of the first stepping switch being connected with selected contacts of the proving switches and being connected with selected first switches to receive power therethrough for enabling sequential circuits to be completed, for supplying power to means for stepping the first stepping switch to step through it sequence.

9. A circuit according to claim 8 and including a second multiple contact stepping switch connected to the power supply and connected to the first stepping switch, and means to step the second stepping switch in concert with the first stepping switch.

10. A circuit according to claim 9 further comprising a plurality of valve operators connected selectively to contacts of the said second stepping switch for receiving power therethrough.

11. A circuit according to claim 10 further comprising a plurality of manual override switches individually connected to the valve operators, and means for connecting the override switches to the power supply for providing power through the switches to the valve operators.

12. A circuit according to claim 9 and including reset means connected to the second stepping switch for receiving power therethrough and connected to the stepping switches for resetting the stepping switches to their original condition.

13. A circuit according to claim 8 further comprising a starter switch, means for connecting the starter switch to the power supply, an alarm, means connected to the starter switch and the alarm for operating the alarm at a start of the sequence.

14. A circuit according to claim 9, and including latching relay means connected to a last contact of the second stepping switch for locking out the stepping switches at an end of a cycle of operation.

* * * * *